United States Patent
Birze et al.

(10) Patent No.: US 9,690,574 B2
(45) Date of Patent: *Jun. 27, 2017

(54) SYSTEM, METHOD, AND COMPUTER-READABLE MEDIUM FOR DEVELOPMENT AND DEPLOYMENT OF SELF-DESCRIBING CONTROLLED DEVICE MODULES IN A CONTROL SYSTEM

(71) Applicant: AMX, LLC, Richardson, TX (US)

(72) Inventors: Brigitte Bernadette Birze, Oak Point, TX (US); Mark Ethard Smith, Garland, TX (US)

(73) Assignee: AMX, LLC, Richardson, TX (US)

( * ) Notice: Subject to any disclaimer, the term of this patent is extended or adjusted under 35 U.S.C. 154(b) by 415 days.

This patent is subject to a terminal disclaimer.

(21) Appl. No.: 14/471,303

(22) Filed: Aug. 28, 2014

(65) Prior Publication Data

US 2014/0371879 A1  Dec. 18, 2014

Related U.S. Application Data

(63) Continuation of application No. 13/550,758, filed on Jul. 17, 2012, now Pat. No. 8,825,880, which is a
(Continued)

(51) Int. Cl.
*G06F 9/44* (2006.01)
*G05B 19/042* (2006.01)
(Continued)

(52) U.S. Cl.
CPC ............... *G06F 8/70* (2013.01); *G05B 15/02* (2013.01); *G05B 19/042* (2013.01); *G05B 19/0428* (2013.01); *G05B 19/4185* (2013.01); *G06F 8/20* (2013.01); *G06F 8/30* (2013.01); *G06F 9/54* (2013.01); *G05B 2219/23051* (2013.01); *G05B 2219/25022* (2013.01); *G05B 2219/25066* (2013.01); *G05B 2219/25101* (2013.01);
(Continued)

(58) Field of Classification Search
CPC ........................ H04L 12/2803–12/2838; H04L 2012/284–2012/285
See application file for complete search history.

(56) References Cited

U.S. PATENT DOCUMENTS

| 7,797,698 | B2* | 9/2010 | Diament | .................. G06F 8/36 717/169 |
| 2002/0078161 | A1* | 6/2002 | Cheng | ................. H04L 12/2803 709/208 |

(Continued)

*Primary Examiner* — David Lazaro
*Assistant Examiner* — Julian Chang

(57) ABSTRACT

A system, method, and computer-readable medium for configuring a controlled device in a control system are provided. A self-describing device Module associated with a controlled device provides capabilities of a controlled device both at runtime and before installation. The controlled device Module includes a capabilities component that provides a description of the controlled device's capabilities both as a capabilities object that can be queried at runtime and in a self-describing capabilities file implemented in a format prior to operational configuration of the Module or controlled device. The Module is configured to generate its runtime capabilities object and self-describing capabilities file.

20 Claims, 4 Drawing Sheets

Related U.S. Application Data continuation of application No. 12/344,866, filed on Dec. 29, 2008, now Pat. No. 8,230,113.

(60) Provisional application No. 61/017,620, filed on Dec. 29, 2007, provisional application No. 61/017,613, filed on Dec. 29, 2007.

(51) Int. Cl.
  *G06F 9/54* (2006.01)
  *G05B 19/418* (2006.01)
  *G05B 15/02* (2006.01)
  *H04L 12/28* (2006.01)
  *G06F 9/445* (2006.01)
  *G06F 9/46* (2006.01)

(52) U.S. Cl.
  CPC ............ *G06F 8/33* (2013.01); *G06F 9/44505* (2013.01); *G06F 9/465* (2013.01); *H04L 12/2805* (2013.01); *H04L 12/2807* (2013.01)

(56) References Cited

U.S. PATENT DOCUMENTS

| | | | |
|---|---|---|---|
| 2002/0116477 A1* | 8/2002 | Somashekar | G06F 9/44505 709/220 |
| 2005/0097203 A1* | 5/2005 | Unbehagen | H04L 12/2854 709/223 |
| 2007/0233881 A1* | 10/2007 | Nochta | G06F 9/5044 709/228 |
| 2009/0113088 A1* | 4/2009 | Illowsky | G06F 1/3203 710/62 |
| 2009/0125612 A1* | 5/2009 | Rabetge | H04L 67/306 709/220 |
| 2009/0171484 A1* | 7/2009 | Birze | G05B 19/042 700/86 |
| 2009/0172137 A1* | 7/2009 | Master | G06F 15/7867 709/222 |
| 2009/0300578 A1* | 12/2009 | Neil | G06F 9/4443 717/104 |

* cited by examiner

SYSTEM, METHOD, AND COMPUTER-READABLE MEDIUM FOR DEVELOPMENT AND DEPLOYMENT OF SELF-DESCRIBING CONTROLLED DEVICE MODULES IN A CONTROL SYSTEM

CROSS REFERENCE TO RELATED APPLICATIONS

This application is a continuation of and claims priority to U.S. patent application Ser. No. 13/550,758, entitled "SYSTEM, METHOD, AND COMPUTER-READABLE MEDIUM FOR DEVELOPMENT AND DEPLOYMENT OF SELF-DESCRIBING CONTROLLED DEVICE MODULES IN A CONTROL SYSTEM", filed Jul. 17, 2012, now issued U.S. Pat. No. 8,825,880, issued Sep. 2, 2014, which is a continuation of U.S. patent application Ser. No. 12/344,866, entitled "SYSTEM, METHOD, AND COMPUTER-READABLE MEDIUM FOR DEVELOPMENT AND DEPLOYMENT OF SELF-DESCRIBING CONTROLLED DEVICE MODULES IN A CONTROL SYSTEM", filed Dec. 29, 2008, now issued U.S. Pat. No. 8,230,113, issued Jul. 24, 2012, which claims priority to U.S. provisional patent application Ser. No. 61/017,613, entitled, "Self Describing Devices", filed Dec. 29, 2007, by Birze, et al. and U.S. provisional patent application Ser. No. 61/017,620, entitled, "Server Enabled Device Description", filed Dec. 29, 2007, by Birze, et al., the disclosures of which are incorporated herein by reference.

FIELD OF THE INVENTION

The present invention is generally related to control systems and, more particularly, to mechanisms for providing self-describing controlled device Modules in a control system.

BACKGROUND OF THE INVENTION

Many systems, such as control systems, monitoring systems, and the like, exist that allow discovery at runtime of devices active in the system. These systems may also discover a device's type thereby allowing basic control and monitoring with no external configuration. However, these systems depend on standardized application programming interfaces (APIs) describing Parameters, Properties, and Control Commands for different device types. Once a device of a known device type is found, the system can use a standardized API for the device type to control, configure, or monitor the device. For example, some of the attributes of security system device types include Properties, such as a manufacture and model, Parameters, such as arm-able state (ability to arm a system) and security state, (such as ARM_HOME, ARM, DISARM, and PANIC), and Commands (such as GetSecurityStatus, setSeucrityState, and isOKToArm).

Unfortunately, many devices have capabilities that do not fit into standardized device type APIs. This particular trend is becoming more prevalent as manufacturers merge multiple capabilities into a single device, e.g., placing a DVD and a VCR in the same device housing.

Companies that support standardized device type APIs must frequently update their APIs to keep up with the latest innovations by device manufactures. This causes deployment issues as the control, monitoring, and integration systems that understand the APIs must be updated to understand devices using the latest APIs.

Many device protocols allow manufactures to add extensions to their device type API to allow the manufacturers to expose their devices' unique capabilities. However, custom code must then be developed and installed in the control or monitoring system to allow the system to utilize a device's extensions thereby requiring intimate knowledge of the control or monitoring system's internals. Additionally, custom code in a control or monitoring system hampers the ability to swap one device of a type for another of the same type. For example, custom code written for a receiver with custom capabilities will not perform when the receiver is swapped for one that does not have the custom capabilities.

Therefore, what is needed is a mechanism that overcomes the described problems and limitations.

SUMMARY OF THE INVENTION

The present invention provides a system, method, and computer-readable medium for configuring a controlled device in a control system. A self-describing device Module associated with a controlled device provides capabilities of a controlled device both at runtime and before installation. The controlled device Module includes a capabilities component that, when queried, provides a description of the controlled device's capabilities both as a capabilities object that can be queried at runtime and in an XML format prior to operational configuration of the Module or controlled device. The Module is configured to generate the runtime capabilities object from the self-describing XML file. An integration IDE may access the controlled device Module to obtain the self-describing XML file and use the XML file to integrate the controlled device's exposed capabilities into the control system. When the controlled device capabilities are integrated into the control system such that the Module and controlled device are operationally configured in the control system, a master controller may retrieve the runtime capabilities object from the Module and thereby control access to the Module and the corresponding controlled device. A remote monitoring system may obtain the controlled device Module's runtime capabilities object and register the controlled device. Thereafter, monitoring and control of the controlled device may then be performed by issuance of suitable commands from the remote monitoring system.

In one embodiment of the disclosure, a method of configuring a controlled device in a control system is provided. The method includes providing access to a Module associated with the controlled device in the control system, receiving, by the Module, a query from a first control system node for capabilities of the controlled device prior to operational configuration of at least one of the Module and the controlled device, replying, by the Module, to the first control system node with a self-describing capabilities file included in the Module that specifies the capabilities of the controlled device, receiving, by the Module, a query from a second control system node after operational configuration of the Module and the controlled device, and replying, by the Module, to the second control system node with a runtime capabilities object that specifies the capabilities.

In a further embodiment of the disclosure, a computer-readable medium having computer-executable instructions for execution by a processing system, the computer-executable instructions for configuring a controlled device in a control system is provided. The computer-readable medium includes instructions that, when executed, cause the processing system to provide access to a Module associated with the controlled device in the control system, receive, by the Module, a query from a first control system node for capabilities of the controlled device prior to operational configuration of at least one of the Module and the controlled device, reply, by the Module, to the first control system node with a self-describing capabilities file included in the Module that specifies the capabilities of the controlled device, generate, by the Module, a runtime capabilities object that specifies the capabilities from the self-describing capabilities file after the Module and the controlled device are operationally configured in the control system, receive, by the Module, a query from a second control system node after operational configuration of the Module and the controlled device, and reply, by the Module, to the second control system node with the runtime capabilities object.

In a further embodiment of the disclosure, a control system for deployment of a controlled device for operation in the control system is provided. The control system includes a master controller, a controlled device coupled with the master controller, a system integration station configured to integrate controlled device capabilities into the control system, a remote monitoring system configured to provide monitoring and control of controlled devices, and a Module associated with the controlled device deployed in the control system on a computer-readable medium and including a self-describing capabilities file. The Module receives a query from the system integration station for capabilities of the controlled device prior to operational configuration of at least one of the Module and the controlled device, replies to the integration station with the self-describing capabilities file, generates a runtime capabilities object that specifies the capabilities from the self-describing capabilities file after the Module and the controlled device are operationally configured in the control system, receives a query from the master controller after operational configuration of the Module and the controlled device, and replies to the master controller with the runtime capabilities object.

BRIEF DESCRIPTION OF THE DRAWINGS

Aspects of the present disclosure are best understood from the following detailed description when read with the accompanying figures, in which.

DETAILED DESCRIPTION OF THE INVENTION

Figure 1:
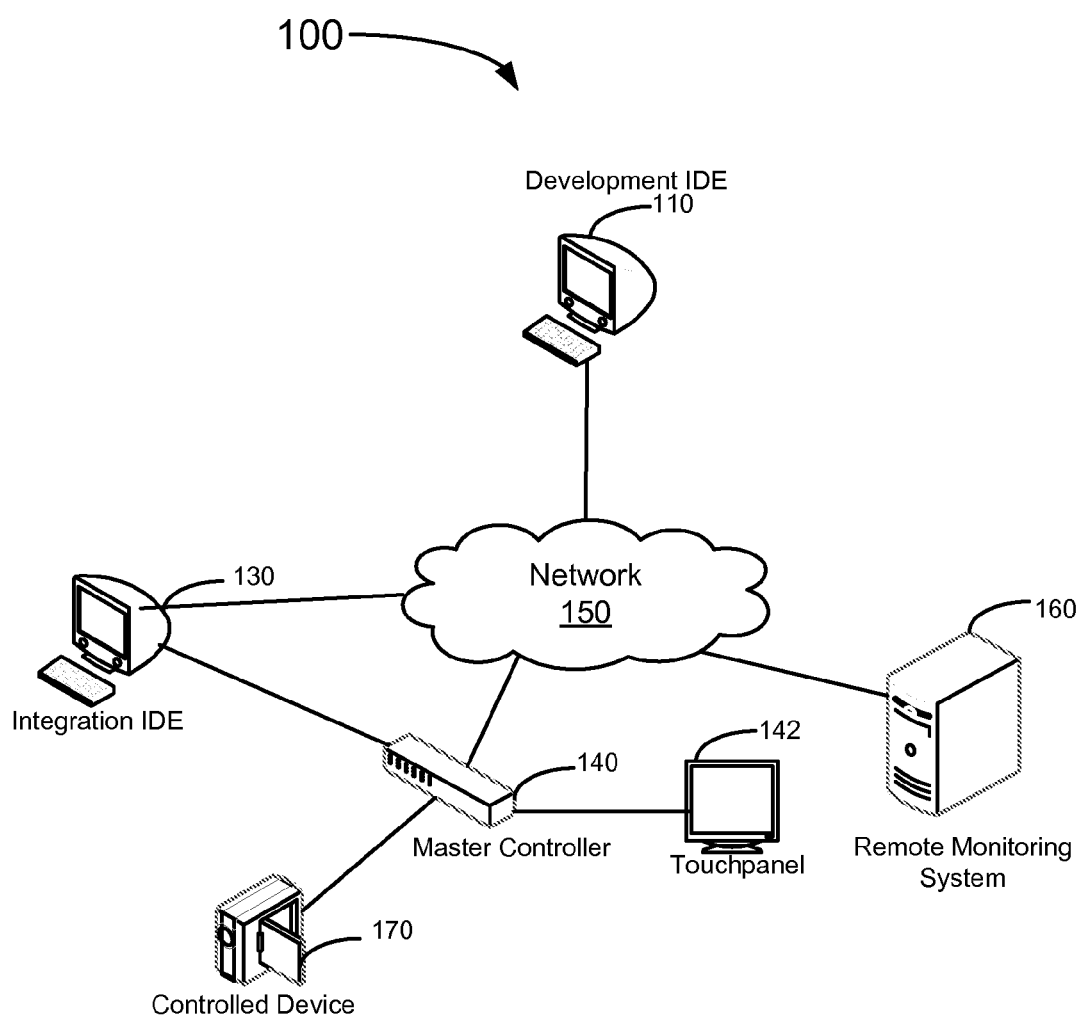
FIG. 1 is a diagrammatic representation of a contemporary control system configuration that provides for control and monitoring of controlled devices deployed in the control system.

It is to be understood that the following disclosure provides many different embodiments or examples for implementing different features of various embodiments. Specific examples of components and arrangements are described below to simplify the present disclosure. These are, of course, merely examples and are not intended to be limiting.

In accordance with disclosed embodiments, a self-describing controlled device Module allows a device to describe itself both at runtime and before installation thereby allowing discovery of the capabilities of the device to enable control, monitoring, and integration of a device with no prior knowledge of the device or the device type. Additionally, custom extensions to a device's capabilities will also be discovered to allow control, monitoring, and integration of these custom extensions without the need for custom code. New devices may then be deployed, or communicatively coupled with, control systems, monitoring systems, configuration tools, or development tools and natively understood with no changes to the systems or tools.

Contemporary products may use application programming interfaces and corresponding device types to provide integration and control of devices in a control system. Exemplary attributes of the Security System device type include Properties, such as manufacture and model, Parameters, and Commands. However, many devices have capabilities that do not fit into such standardized APIs, and the trend is becoming more prevalent as manufacturers merge multiple capabilities into a single device.

In accordance with disclosed embodiments, mechanisms for provisioning a self-describing controlled device Module are provided. As referred to herein a device Module comprises a component that allows a device to be deployed in a control or remote monitoring system (collectively referred to herein simply as a control system). The device Module may be implemented as computer-executable or computer-readable instructions tangibly embodied on a computer-readable medium. A device, such as a camera, tuner, or any other device that may be monitored, controlled, or otherwise manipulated via the control system, is referred to herein as a controlled device. A controlled device has a corresponding device Module that facilitates deployment and operation of the controlled device within the control system. The control system may include various system entities or nodes that facilitate controlled device configuration and deployment, management, operation, control, monitoring, or other manipulations of a controlled device. Control system entities are referred to herein as control system devices (or simply system devices). Exemplary system devices include, for example, a master controller, a remote monitoring system (RMS), and any variety of Integrated Development Environment (IDE) systems or tools used for device integration, deployment or configuration.

The self-describing device Modules implemented according to disclosed embodiments are able to describe the capabilities of a controlled device both at runtime and before installation. Advantageously, the discovery of the capabilities of the device by other system devices with no prior knowledge of the device or its device type is provided. A master controller is able to control the controlled device, an RMS is able to monitor the controlled device, and an integration IDE is able to integrate the device Module with no changes to other control system devices. Additionally, custom extensions to device APIs may be allowed and may also be discoverable to allow control, monitoring, and integration of these custom extensions without the need for custom code.

FIG. 1 is a diagrammatic representation of a contemporary control system 100 configuration that provides for device control and monitoring in control system 100. A controlled device development IDE 110 may be used by device manufactures, e.g., a manufacturer of a controlled device 170, to develop a Module for the corresponding controlled device. Alternatively, the development IDE 110 may be used by manufacturers or developers of control system devices. A Module provides customized control and monitoring for a specific controlled device model from a specific manufacturer in a control system 100.

An integration IDE 130 allows device dealers to easily integrate multiple Modules and their associated controlled devices into a single control system 100. An integration tool run at integration IDE 130 may provide a visual mechanism of generating Touchpanel glue code to tie, for example, touch panel 142 inputs with each device Module's API to control and monitor the associated device.

Modules integrated with integration IDE 130 may be loaded onto a master controller 140 to enable control of the corresponding devices in the control system 100. NetLinx code generated by integration IDE 130 may also be loaded onto the master controller 140 to link touch panels, or other peripheral devices, with the control and monitoring APIs exposed by the device Modules generated by development IDE 110.

A remote monitoring system (RMS) 160 may feature a resource management suite that provides remote monitoring and control of various controlled devices 170 integrated in control system 100. The RMS 160 may comprise an RMS server that communicates with RMS agents installed on the system master controller 140. The RMS enables administrators to gather status of controlled devices and to control the devices participating in the control system 100 that are deployed via the master controller 140. Various control system devices are communicatively coupled with one another, e.g., via a network 150, a direct connection, or another suitable interface.

Contemporary API specifications create a control system which provides rigid device development, yet does not provide effective runtime enforcement. This introduces ambiguity and creates issues for control system devices or products collaborating to provide control and monitoring for controlled devices deployed in control system 100.

A control system device software development kit (SDK) composed of SDK components is used to create Modules for controlled devices. SDK components each expose an API that describes the mechanisms for controlling and monitoring the common device component. For example, a Power Supply is a device component used in many device types and thus may have a corresponding Power Supply SDK component at the development IDE 110.

Typical SDK components are grouped into well know device types which are rigid in their structure. These well known device types cannot easily account for device innovations in the form of new functionality or combinations of different device types. For example, a VCR comprises a power supply, a television tuner, and a tape transport. A device type specified as a VCR may then have a respective SDK component for the power supply, television tuner, and the tape transport. In a similar manner, a DVD player comprises a power supply and a disc transport. A device type specified as a DVD player may have a respective SDK component for the power supply and the disc transport. In this manner, well known device types may be accommodated by various automated tools for configuration and deployment in a control system. However, consider a manufacturer that has produced a DVD/VCR combination. In this instance, another device type must be defined for efficient deployment of the DVD/VCR combination since neither the SDK components grouped into the VCR device type nor the SDK components of the DVD device type may appropriately address the combination device. Module developers may add custom capabilities as custom events, but these are not natively understood by any tools or control system devices or products requiring, for example, custom Touchpanel code to utilize the unique device capabilities. Thus, a device SDK must be disadvantageously updated periodically to accommodate new or modified device types. Consequently, controlled device deployment issues are often encountered as the system master controller 140 can support only one version of the device APIs. If an updated API "breaks" a legacy Module's existing functionality, the legacy Module must be "reopened" to account for the updated APIs in order to function on new control system installations. This ongoing SDK and Module maintenance consumes software engineering and development time, aggravates system partners that may not be aware of SDK updates, and complicates integration and deployment for product dealers.

Integration IDE 130 may import a Module's generated module.xml file to determine the device type and the Commands, Parameters, and Properties available for the Module. This data is checked against the expected Commands, Parameters, and Properties for the device type from the most recent Device SDK API. If there is a mismatch due to an out of date Module, the mismatched commands will not appear in the code builder and thus will not be available to the system integrator. Custom commands and events representing extensions to the standard device type are not exposed to integration IDE 130 and cannot be exposed to the system integrator.

In accordance with disclosed embodiments, a device Module configuration relaxes the rigidity of development while enforcing runtime access to only defined Commands, Parameters, and Properties. This shift in perspective eliminates the frustration of Module developers not being able to "fit" their device capabilities into a pre-defined device SDK. Module developers are able to mix and match standard SDK components to accommodate new device combinations while also creating custom commands and events to capture unique device capabilities in accordance with disclosed embodiments. A development IDE captures this information and generates a framework that describes the capabilities of the Module.

Central to the disclosed controlled device Module implementation is the creation of a capabilities component. When queried, a Module's capabilities component is able to describe its Module's capabilities both as a capabilities object that can be queried at runtime and in an XML format, or other instruction set, that can be saved or passed in messages between control system devices, such as the master controller and RMS. This same capabilities component will be able to create a runtime capabilities object from consuming the self-describing XML file.

Figure 2:
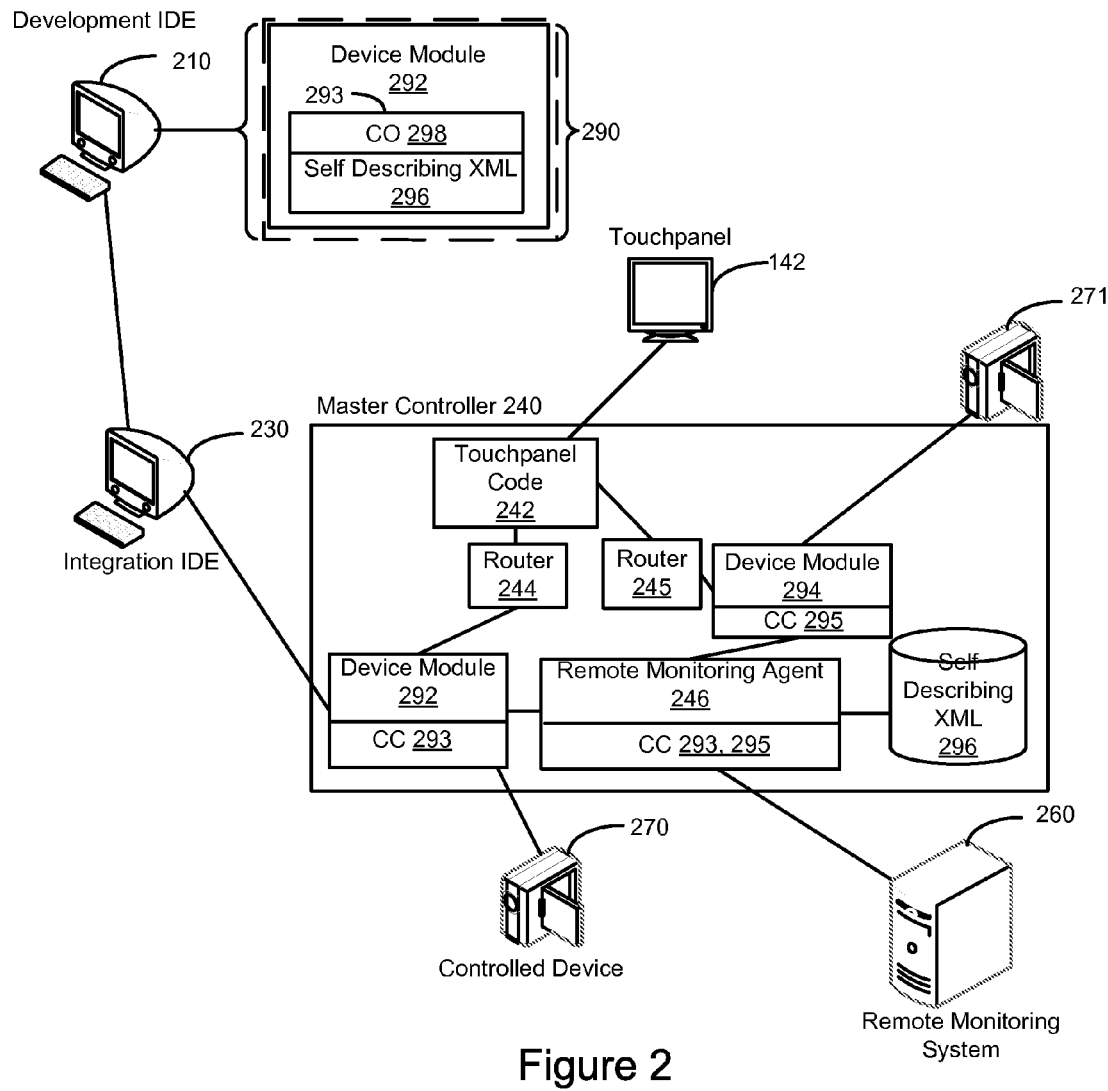
FIG. 2 is a diagrammatic representation of a control system configuration that facilitates controlled device Module development and deployment in accordance with embodiments.

FIG. 2 is a diagrammatic representation of a control system configuration that facilitates controlled device Module development and deployment in accordance with embodiments.

A controlled device Module development IDE 210 may be used by controlled device manufactures, e.g., manufacturers of controlled and monitored devices 270-271, or control system device manufacturers to develop self-describing Modules for corresponding controlled devices.

An integration IDE 230 allows device dealers to integrate multiple Modules and their associated controlled devices into a single control system. An integration code builder tool run at integration IDE 230 may provide a visual mechanism of generating Touchpanel glue code to tie, for example, touch panel inputs with each device Module's API to control and monitor the associated controlled device.

Modules integrated with integration IDE 230 may be loaded onto a system master controller 240 to enable control of the controlled devices in the control system.

An RMS 260 provides remote monitoring and control of various controlled devices 270-271 integrated in control system. The RMS may comprise a resource management suite that communicates with RMS agents installed on the system master controller 240. RMS 260 enables administrators to gather status of controlled devices and to control the devices participating in the control system deployed via master controller 240.

Each Module facilitates control and monitoring for a corresponding controlled device in control system. In accordance with an embodiment, a Module package 290 is produced by development IDE 210 that includes the device Module 292 and a capabilities component (CC) 293 that facilitates device deployment and operation within the control system. In accordance with an embodiment, a CC is provided for each controlled device type. Thus, controlled device 270 may have a CC 293 associated therewith, and controlled device 271 may have a CC 295 associated therewith. The RMS 260 may access each CC 293 and 295 of associated controlled devices 270-271. The Module package, such as Module package 290, and constituent components are associated with a particular controlled device, such as controlled device 270. A corresponding capabilities component 293 includes a self-describing XML file 296, or other suitable instruction set, that specifies the capabilities of the corresponding controlled device 270 including Properties, such as the device manufacturer and model, Parameters, such as controlled device 270 parameter states and status, and commands. As referred to herein, Parameters are mutable values describing the state of the controlled device. Parameters can be queried or delivered as asynchronous events. Properties are immutable values describing the controlled device, such as a manufacturer and model. Control Commands comprise methods which can be invoked to control the device to change the controlled device 270 configuration or state.

A capabilities component, such as CC 293, is configured to be queried by one or more control system devices including configuration, integration, and deployment tools, e.g., integration IDE 230 and RMS 260, and return Module capabilities in response to the query. The Module capabilities may be provided by the capabilities component as the XML file 296 prior to complete operational configuration of the Module 292 and corresponding controlled device 270. Further, the self-describing XML file 296 may be conveyed between one or more control system devices or components. When the device Module 292 and corresponding controlled device 270 are operationally deployed within the control system, a corresponding capabilities component 293 may generate a capabilities object 298 from the self-describing XML file 296. At this point, response to runtime queries issued to the capabilities component 293 may be provided by the capabilities object 298.

Various control system devices, such as the integration IDE 230, RMS 260, and master controller 240 may access a respective capabilities component, such as CC 293. The capabilities component allows for strict enforcement during integration of the corresponding controlled device 270 within the control system and during controlled device 270 runtime.

The controlled device 270 is coupled with the master controller 240 and is thereby provisioned a communication interface with the corresponding Module 292. When the Module and controlled device are operationally configured within the control system, supported control and monitoring commands may be conveyed from the Module 292 to the controlled device 270. To this end, the controlled device Module may communicatively interface with an remote monitoring agent 246 that, itself, may be communicatively coupled with RMS 260, e.g., via a network connection, a direct connection, or other suitable communication medium. The remote monitoring agent 246 may include or interface with an instance of the self-describing XML file 296. At runtime, the remote monitoring agent 246 may obtain the capabilities component 293 in the form of the capabilities object 298. When the controlled device is registered with RMS 260, an administrator may issue control and monitoring commands that are received by the remote monitoring agent 246 associated with the controlled device 270.

The controlled device Module 292 additionally interfaces with a controlled device router 244 that is allocated for, and associated with, the controlled device 270. The router 244 is identified and loaded by the master controller 240 to enable communications between Touchpanel code 242 and the code environment, e.g., Java, in which Module 292 is deployed. To this end, Module 292 may include a manifest that specifies the router 244 to be loaded and associated with Module 292, and master controller 240 is configured to examine the Module's manifest for such purposes. When loaded, the router 244 will query the associated Module 292 to discover its capabilities via a returned capabilities object (illustratively represented as a capabilities component 298). Only the capabilities described by the Module 292 will be sent to, or received from, the router 244. Commands or monitoring requests conveyed to the router 244 that are not included in the Module's capabilities object will be returned with a "not implemented" error or other suitable fault. Other controlled devices 271-272 may have corresponding Modules, associated RMS agents, and routers configured on master controller 240.

The control system may accommodate controlled devices, such as a controlled device 271, that has a legacy controlled device Module 294 and a corresponding router 245. Legacy controlled device Module 294 does not have the ability to provide capabilities of the controlled device 273, both rather may only provide a device type and version, e.g., to remote monitoring agent 246.

Figure 3:
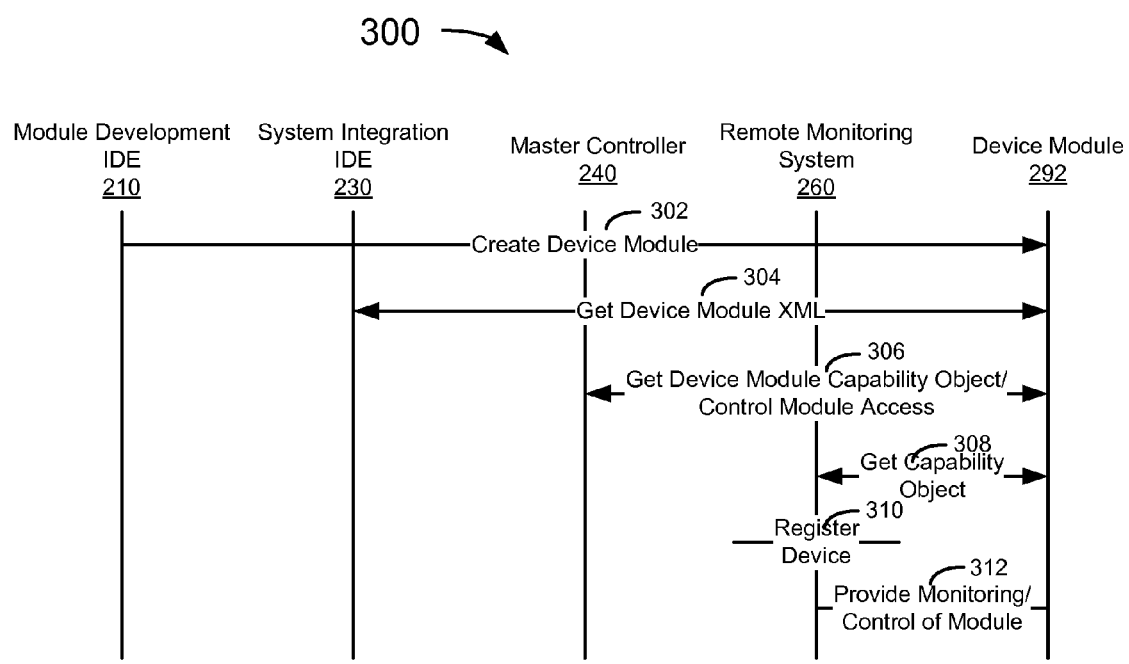
FIG. 3 is a diagrammatic representation of a controlled device Module and controlled device development and deployment work flow implemented in accordance with an embodiment.

FIG. 3 is a diagrammatic representation of a controlled device Module and controlled device development and deployment work flow 300 implemented in accordance with an embodiment.

A device Module is produced at development IDE 210 (step 302). The controlled device Module 292 created at the development IDE 210 includes a self-describing capabilities XML file 296 for use prior to complete configuration of the controlled device 270 and corresponding Module 292 within control system. The Module 292 includes suitable logic for creating and exposing a capabilities object 298 and/or a self-describing XML file 296 for use at runtime, i.e., when the controlled device and Module are operationally configured for use in control system. An integration IDE 230 may then access the controlled device Module 292 to obtain the self-describing XML file 296 (step 304). On receipt of the self-describing XML file 296, the integration IDE 230 use the XML file 296 to integrate the controlled device's exposed capabilities into the control system. Once the device's capabilities are integrated into the control system such that the controlled device and Module are operationally configured, the master controller 240 may retrieve the runtime capabilities object from the Module 292 and thereby control access to the Module and the corresponding controlled device (step 306). The master controller utilizes the runtime capabilities object 298 to allow or prohibit monitoring requests and commands issued for the controlled device 270 according to the capabilities advertised or otherwise provided by the capabilities object 298. The remote monitoring system 260 may likewise obtain the controlled device Module's capabilities object (step 308), and the remote monitoring system may register the controlled device accordingly (step 310). The remote monitoring system uses the capabilities description provided by the capabilities object to advertise the device capabilities to a remote monitoring system administrator. The administrator may then complete a monitoring and control configuration for the device that is constrained by the device capabilities advertised by the controlled device capabilities object. Monitoring and control of the controlled device may then be performed by issuance of suitable commands from the remote monitoring system to the device Module 292 (step 312).

The development IDE 210 used for creation of the device Module according to step 302 may include an SDK that features low-level, reusable, controlled device SDK component building blocks, e.g., power supply, key pad, sensor device, or other common SDK components. However, the use of SDK components for creation of a Module 292 implemented in accordance with embodiments advantageously does not rely on module indexing, e.g., the association of one or more SDKs with a particular controlled device type. Rather, SDK components that are available and that may be utilized for Module development are not bound by a particular device type, and thus Module developers may freely mix and match SDK components. Further, the SDK preferably provides mechanisms for creating custom events and commands for the controlled device that may be accommodated by the corresponding Module. Advantageously, development and deployment of controlled devices within control system does not require any rigid notion of a device type and a required SDK components association. Module developers are able to create their own device types or, alternatively, start with a known device type and remove or add SDK component at will.

Completed controlled device Modules developed at development IDE 210 are packaged for installation on master controllers. Completed Modules employ a capabilities component 293 to allow the Module to provide a description of the services it offers as both a runtime capabilities object 298 and in a self-describing XML file 296.

Figure 4:
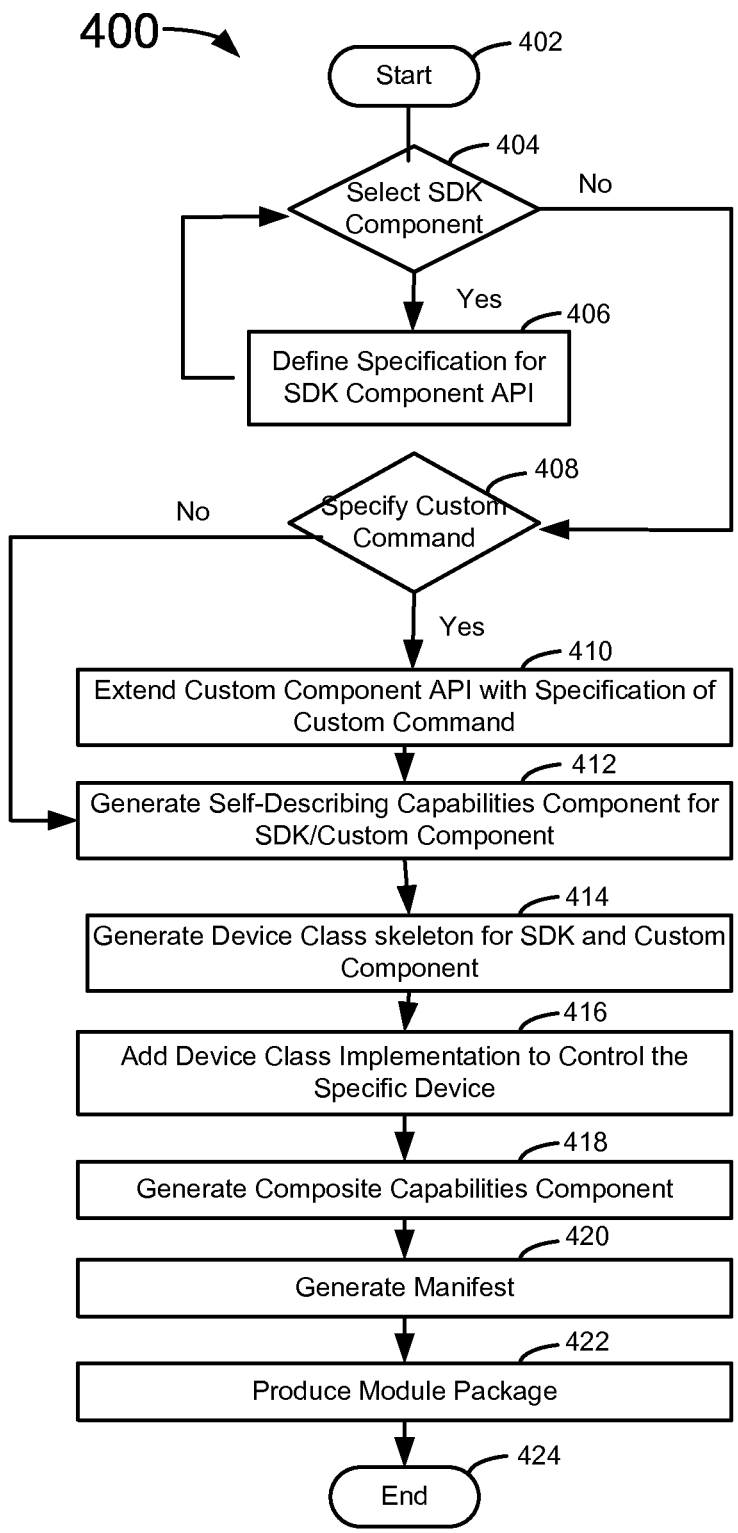
FIG. 4 is a flowchart that depicts a controlled device Module creation routine implemented in accordance with an embodiment.

FIG. 4 is a flowchart 400 that depicts a controlled device Module creation routine implemented in accordance with an embodiment. The processing steps of FIG. 4 may be implemented as computer-executable instructions executable by a processing system, such as the development IDE 210 depicted in FIG. 2.

The Module creation routine is invoked (step 402), and the Module designer may be presented with various SDK components for selection to include in the Module for a corresponding device component (step 404). If the designer selects an SDK component, the metadata on the API is then specified including valid parameter ranges and values, descriptions, etc (step 406). Specification of the interface API may include specifying one or more commands, parameters, and/or properties and may include the specification of metadata including descriptions, parameters types, and valid ranges. Once the selected SDK component function's interface API has been defined by the designer, the designer may choose an additional SDK component according to step 404.

When no additional SDK components are selected by the Module designer, the designer may be provided an option to specify custom commands (step 408). If the designer so chooses, the designer may extend a custom component API by the specification of custom commands or events for the Module 292 (step 410). In an embodiment, the IDE 210 may provide required fields to facilitate generation of a corresponding custom component. For example, the IDE 210 may require the designer to specify one or more Commands, Properties, and Parameters that are to be associated with the custom command or event, and may require the supply of metadata including descriptive text and valid ranges of the one or more Commands, Properties, or Parameters. After specification of the custom command or event and corresponding Commands, Properties, and/or Parameters and associated descriptive text and metadata, the IDE 210 may then generate a self-describing capabilities component for the SDK/custom component (step 412). The custom component generated by IDE 210 encapsulates the device's custom commands and events.

Thereafter, the IDE 210 may then generate a device class skeleton for the SDK and custom component (step 414). A device class implementation is then added to control the specific device (step 416). A composite capabilities component may then be generated from each of the capabilities and custom components (step 418). In an embodiment, the composite capabilities component may comprise a self-describing XML file 296 from which Module 292 may generate a runtime capabilities object when Module 292 is operationally configured and deployed in control system. A manifest may then be generated for Module 292 (step 420). In an embodiment, the manifest generated for the Module 292 may specify a generic router 244 that is adapted to interface with self-describing Module 292. The completed Module package 290 is then produced by IDE 210 (step 422). In an embodiment, the Module package 290 includes the generated manifest, the chosen SDK components, custom components, and the composite capabilities component 293 including the generated self-describing XML file 296. The Module creation routine cycle may then end (step 424).

As described, mechanisms for configuring a controlled device in a control system are provided. A self-describing device Module associated with a controlled device provides capabilities of a controlled device both at runtime and before installation. The controlled device Module includes a capabilities component that, when queried, provides a description of the controlled device's capabilities both as a capabilities object that can be queried at runtime and in an XML format prior to operational configuration of the Module or controlled device. The Module is configured to generate the runtime capabilities object from the self-describing XML file. An integration IDE may access the controlled device Module to obtain the self-describing XML file and use the XML file to integrate the controlled device's exposed capabilities into the control system. When the controlled device capabilities are integrated into the control system such that the Module and controlled device are operationally configured in the control system, a master controller may retrieve the runtime capabilities object from the Module and thereby control access to the Module and the corresponding controlled device. A remote monitoring system may obtain the controlled device Module's runtime capabilities object and register the controlled device. Thereafter, monitoring and control of the controlled device may then be performed by issuance of suitable commands from the remote monitoring system.

The flowchart of FIG. 4 depicts process serialization to facilitate an understanding of disclosed embodiments and is not necessarily indicative of the serialization of the operations being performed. In various embodiments, the processing steps described in FIG. 4 may be performed in varying order, and one or more depicted steps may be performed in parallel with other steps. Additionally, execution of some processing steps of FIG. 4 may be excluded without departing from embodiments disclosed herein.

The illustrative block diagrams depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single processor or multiple processors. Additionally, various steps of embodiments of the invention may provide one or more data structures generated, produced, received, or otherwise implemented on a computer-readable medium, such as a memory.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method, comprising:
   receiving, by a module, a query from a first control system node for capabilities of a controlled device prior to operational configuration of at least one of the module and the controlled device;
   replying, by the module, to the first control system node with a self-describing capabilities file that specifies the capabilities of the controlled device;
   receiving, by the module, a query from a second control system node after operational configuration of the module and the controlled device; and
   replying, by the module, to the second control system node with a runtime capabilities object.

2. The method of claim 1, wherein the self-describing capabilities file, included in the module, comprises an extensible markup language file.

3. The method of claim 1, further comprising generating, by the module, the runtime capabilities object and the self-describing capabilities file after the module and the controlled device are operationally configured in the control system, wherein the runtime capabilities object that specifies the capabilities.

4. The method of claim 1, wherein the capabilities include a parameter, property, and control command of the controlled device.

5. The method of claim 1, wherein the first control system node comprises a system integration station, the method further comprising integrating the controlled device capabilities into the control system by the system integration station based on the self-describing capabilities file.

6. The method of claim 1, wherein the second control system node comprises a master controller, the method further comprising allowing or prohibiting access to the controlled device according to the capabilities specified in the runtime capabilities object.

7. The method of claim 1, further comprising:
   obtaining the runtime capabilities object by a remote monitoring system deployed in the control system; and
   registering the controlled device with the remote monitoring system according to the capabilities specified in the runtime capabilities object.

8. The method of claim 7, further comprising providing monitoring and control of the controlled device by the remote monitoring system responsive to registering the controlled device.

9. A non-transitory computer-readable medium having computer-executable instructions for execution by a processing system, the computer-executable instructions, when executed, cause the processing system to:
   receive, by a module, a query from a first control system node for capabilities of a controlled device prior to operational configuration of at least one of the module and the controlled device;
   reply, by the module, to the first control system node with a self-describing capabilities file that specifies the capabilities of the controlled device;
   generate, by the module, a runtime capabilities object that specifies the capabilities from the self-describing capabilities file after the module and the controlled device are operationally configured in the control system;

receive, by the module, a query from a second control system node after operational configuration of the module and the controlled device; and reply, by the module, to the second control system node with the runtime capabilities object.

10. The non-transitory computer-readable medium of claim 9, wherein the self-describing capabilities file, included in the module, comprises an extensible markup language file.

11. The non-transitory computer-readable medium of claim 9, wherein the capabilities include a parameter, property, and control command of the controlled device.

12. The non-transitory computer-readable medium of claim 9, wherein the first control system node comprises a system integration station, the computer-readable medium further comprising instructions that, when executed, cause the processing system to integrate the controlled device capabilities into the control system by the system integration station based on the self-describing capabilities file.

13. The non-transitory computer-readable medium of claim 9, wherein the second control system node comprises a master controller, the computer-readable medium further comprising instructions that, when executed, cause the processing system to allow or prohibit access to the controlled device according to the capabilities specified in the runtime capabilities object.

14. The non-transitory computer-readable medium of claim 9, further comprising instructions that, when executed, cause the processing system to:

obtain the runtime capabilities object by a remote monitoring system deployed in the control system; and register the controlled device with the remote monitoring system according to the capabilities specified in the runtime capabilities object.

15. The non-transitory computer-readable medium of claim 14, further comprising instructions that, when executed, cause the processing system to provide monitoring and control of the controlled device by the remote monitoring system responsive to registering the controlled device.

16. A system, comprising:

a master controller;

a controlled device coupled with the master controller;

a system integration station configured to integrate controlled device capabilities into the control system;

a remote monitoring system configured to provide monitoring and control of controlled devices; and a module including a self-describing capabilities file, wherein the module receives a query from the system integration station for capabilities of the controlled device prior to operational configuration of at least one of the module and the controlled device, replies to the integration station with the self-describing capabilities file, generates a runtime capabilities object that specifies the capabilities from the self-describing capabilities file after the module and the controlled device are operationally configured in the control system, and provides to the master controller with the runtime capabilities object.

17. The system of claim 16, wherein the self-describing file comprises an extensible markup language file.

18. The system of claim 16, wherein the capabilities include a parameter, property, and control command of the controlled device.

19. The system of claim 16, wherein the master controller allows or prohibits access to the controlled device according to the capabilities specified in the runtime capabilities object.

20. The system of claim 16, wherein the remote monitoring system obtains the runtime capabilities object and registers the controlled device with the remote monitoring system according to the capabilities specified in the runtime capabilities object.

* * * * *